US011849682B2

(12) United States Patent
Lloyd-Jones et al.

(10) Patent No.: US 11,849,682 B2
(45) Date of Patent: Dec. 26, 2023

(54) HYDROPONICS GROWING SYSTEM AND METHOD

(71) Applicant: JONES FOOD COMPANY LIMITED, Scunthorpe (GB)

(72) Inventors: James Lloyd-Jones, Hatfield (GB); Paul Challinor, Hatfield (GB)

(73) Assignee: JONES FOOD COMPANY LIMITED, Scunthorpe (GB)

( * ) Notice: Subject to any disclaimer, the term of this patent is extended or adjusted under 35 U.S.C. 154(b) by 219 days.

(21) Appl. No.: 17/267,291

(22) PCT Filed: Aug. 12, 2019

(86) PCT No.: PCT/EP2019/071618
§ 371 (c)(1),
(2) Date: Feb. 9, 2021

(87) PCT Pub. No.: WO2020/030825
PCT Pub. Date: Feb. 13, 2020

(65) Prior Publication Data
US 2021/0307268 A1    Oct. 7, 2021

(30) Foreign Application Priority Data
Aug. 10, 2018  (GB) .................... 1813025.2

(51) Int. Cl.
*A01G 31/00*  (2018.01)
*A01G 31/04*  (2006.01)
(Continued)

(52) U.S. Cl.
CPC ........... *A01G 31/045* (2013.01); *A01G 7/045* (2013.01); *A01G 31/06* (2013.01); *C09D 5/14* (2013.01)

(58) Field of Classification Search
CPC ...... A01G 31/045; A01G 31/06; A01G 9/143; A01G 9/0299
See application file for complete search history.

(56) References Cited

U.S. PATENT DOCUMENTS 3,432,965 A * 3/1969 Smith .................. A01G 31/045
                                             47/60
4,068,405 A    1/1978 Campbell et al.
(Continued)

FOREIGN PATENT DOCUMENTS

CN    203985407 U    12/2014
CN    104351033 A     2/2015
(Continued)

OTHER PUBLICATIONS

Office Action (Examination Report No. 2) dated Oct. 17, 2022, by the Australian Patent Office in corresponding Australian Patent Application No. 2019316745. (2 pages).
(Continued)

*Primary Examiner* — Monica L Perry
(74) *Attorney, Agent, or Firm* — BUCHANAN INGERSOLL & ROONEY PC

(57) ABSTRACT

Apparatus for use in a hydroponic growing system is described. The apparatus include a frame of vertical members and horizontal members supporting horizontal tracks or guideways on which a set of growing vehicles are mounted. The growing vehicles each contain a number of growing trays in which plants or crops are accommodated whilst they grow. The apparatus is located within a high care facility within the hydroponic growing system.

18 Claims, 8 Drawing Sheets

(51) Int. Cl.
*A01G 7/04* (2006.01)
*A01G 31/06* (2006.01)
*C09D 5/14* (2006.01)

(56) References Cited

U.S. PATENT DOCUMENTS

| | | | | |
|---|---|---|---|---|
| 5,438,794 | A * | 8/1995 | Wi | A01G 9/143 47/17 |
| 6,374,537 | B1 * | 4/2002 | Van Wingerden ... | A01G 31/042 47/17 |
| 6,578,319 | B1 | 6/2003 | Cole et al. | |
| 10,660,282 | B1 * | 5/2020 | Parrish | A01G 9/249 |
| 11,116,148 | B1 * | 9/2021 | French | A01G 9/1476 |
| 2012/0137578 | A1 * | 6/2012 | Bradford | A01G 9/143 47/65.5 |
| 2012/0144740 | A1 | 6/2012 | Igarashi | |
| 2014/0259920 | A1 * | 9/2014 | Wilson | A01G 7/045 47/62 R |
| 2014/0325906 | A1 * | 11/2014 | Marchildon | A01G 31/047 47/66.6 |
| 2015/0000191 | A1 * | 1/2015 | Nagadome | A01G 7/045 47/66.6 |
| 2015/0014440 | A1 * | 1/2015 | Nagadome | A01G 25/02 239/289 |
| 2015/0250115 | A1 * | 9/2015 | Pickell | A01G 31/042 47/62 R |
| 2016/0302369 | A1 * | 10/2016 | Pickell | A01G 31/045 |
| 2017/0223904 | A1 | 8/2017 | Raccanello | |
| 2018/0035624 | A1 * | 2/2018 | Itoh | A01G 31/06 |
| 2018/0206422 | A1 * | 7/2018 | Vandecruys | A01G 7/02 |
| 2018/0235156 | A1 * | 8/2018 | Blair | A01G 27/003 |
| 2018/0359944 | A1 * | 12/2018 | Millar | A01G 31/045 |
| 2018/0362055 | A1 * | 12/2018 | Millar | A01G 9/14 |
| 2018/0362265 | A1 * | 12/2018 | Millar | B65G 17/002 |
| 2018/0362272 | A1 * | 12/2018 | Stott | B62B 5/0076 |
| 2020/0236883 | A1 * | 7/2020 | Ambrosi | A01G 9/143 |
| 2020/0281129 | A1 * | 9/2020 | Anderson | A01G 9/0297 |
| 2021/0185955 | A1 * | 6/2021 | Sakaguchi | A01G 31/06 |

FOREIGN PATENT DOCUMENTS

| | | |
|---|---|---|
| CN | 104855267 A | 8/2015 |
| CN | 204560511 U | 8/2015 |
| CN | 105532420 A | 5/2016 |
| CN | 106234197 A | 12/2016 |
| CN | 106416989 A | 2/2017 |
| CN | 108024508 A | 5/2018 |
| GB | 2121263 A | 12/1983 |
| GB | 2162033 A | 1/1986 |
| JP | 2008099569 A | 5/2008 |
| JP | 2012034686 A | 2/2012 |
| JP | 2015037383 A | 2/2015 |
| JP | 2017201971 A | 11/2017 |
| JP | 2018139517 A | 9/2018 |
| KR | 20120131667 A | 12/2012 |
| KR | 20170057685 A | 5/2017 |
| SU | 1732873 A1 | 5/1992 |
| WO | 2010029993 A1 | 3/2010 |
| WO | 2017024353 A1 | 2/2017 |
| WO | 2019157306 A1 | 8/2019 |

OTHER PUBLICATIONS

Search Report and Written Opinion dated Sep. 26, 2022, by the Singaporean Patent Office in corresponding Singaporean Application No. 11202012125T. (8 pages).
Office Action (Examination Report) dated Apr. 12, 2021, by the Great Britain Patent Office in corresponding Great Britain Patent Application No. 1911505.4. (2 pages).
Office Action (Examination Report) dated Oct. 13, 2021, by the Great Britain Patent Office in corresponding Great Britain Patent Application No. GB1911505.4 (3 pages).
Office Action dated Apr. 26, 2022, by the Canadian Patent Office in corresponding Canadian Patent Application No. 3,107,081. (4 pages).
GB Examination Report dated Feb. 7, 2020.
GB Examination Report dated Nov. 25, 2020.
International Search Report (PCT/ISA/210) dated Dec. 9, 2019, by the European Patent Office as the International Searching Authority for International Application No. PCT/EP2019/071618.
Written Opinion (PCT/ISA/237) dated Dec. 9, 2019, by the European Patent Office as the International Searching Authority for International Application No. PCT/EP2019/071618.
First Office Action dated Mar. 1, 2022, by the Japanese Patent Office in corresponding Japanese Patent Application No. 2021-503764, and an English Translation of the Office Action. (9 pages).
Office Action (Examination Report No. 1) dated Nov. 2021, by the Australian Patent Office in corresponding Australian Patent Application No. 2019316745. (5 pages).
First Office Action dated Jan. 4, 2022, by the Chinese Patent Office in corresponding Chinese Patent Application No. 201980052624.9, and an English Translation of the Office Action. (15 pages).
Office Action dated Dec. 13, 2022, by the Canadian Patent Office in corresponding Canadian Patent Application No. 3,107,081. (4 pages).
Search Report issued in GB Application No. GB1813025.2; dated Feb. 6, 2019; 4 pages.
Search Report issued in GB Application No. GB2203352.6.; dated Jul. 4, 2022; 6 pages.

* cited by examiner

HYDROPONICS GROWING SYSTEM AND METHOD

This application claims priority from UK Patent Application No. GB1813025.2 filed on 10 Aug. 2018, the contents of which are hereby incorporated by reference.

The present invention relates to a hydroponics growing system and to a method of growing a crop hydroponically.

Hydroponics is a broad term given to a number of methods of soilless growing of a plant crop, in which the crop is raised using only water, nutrients and a soilless substrate. It has several advantages over soil-based agriculture, not least in the quantity of water that is needed, but also in the ability to control the growing environment.

Embodiments of the present invention aim to provide a hydroponic growing system and method with improved efficiency.

The present invention is defined in the attached independent claims, to which reference should now be made. Further, preferred features may be found in the sub-claims appended thereto.

According to one aspect of the present invention, there is provided a hydroponic growing system comprising:
a support structure, a plurality of moveable support vehicles and a drive unit, wherein the support vehicles are mountable on the support structure and are arranged in use to contain a growing crop, and the drive unit is arranged to move the support vehicles from an initial position to a final position during growth of the crop.

The growing system preferably comprises an irrigation system arranged to irrigate the growing crop. The irrigation system is preferably arranged to supply water, and optionally one or more nutrients, to the growing crop. The irrigation system preferably comprises at least one supply conduit and at least one overflow conduit.

The irrigation system preferably includes ultraviolet radiation apparatus, more preferably UC-C radiation apparatus, to treat the water. In a preferred arrangement irrigation fluid is re-circulated. The re-circulated fluid may be screened and irradiated to reduce/mitigate/prevent contamination of the irrigation fluid.

The system preferably includes ultraviolet radiation apparatus, more preferably UV-C—for irradiating a growing atmosphere around the crop.

The growing system preferably comprises an illuminating apparatus, such as one or more lamps, for illuminating the growing crop, more preferably with a growth-promoting light source.

In a preferred arrangement, the support vehicles each contain one or more growing trays which may contain a growing medium for growing a crop.

The support structure preferably comprises at least one guideway along which the support vehicles are arranged to be conveyed. The guideway preferably comprises a low-friction path or track and may include a one or more low-friction bearings, such as rollers or wheels, against which a portion of the support vehicle is arranged to roll.

Alternatively, or in addition, the support vehicle may comprise one or more low-friction bearings, such as rollers or wheels, arranged to run in a track of the support structure.

The drive unit may comprise pneumatic means, such as a pneumatic actuator or air ram.

The support structure preferably comprises a frame/rack, and more preferably comprises a plurality of levels, which may be vertically spaced from one another. One or more of the levels may include at least one guideway. And a plurality of support vehicles.

The system may comprise a modular apparatus including a plurality of bays each comprising a frame/rack containing a plurality of levels.

According to another aspect of the present invention, there is provided a method of growing a crop hydroponically, the method comprising growing the crop in a plurality of support vehicles mounted in a support structure for movement on a guideway therein under the action of a drive unit, wherein the method comprises inserting a support vehicle at an initial position and removing the support vehicle at a final position, wherein the crop is arranged to grow between the initial and final positions.

According to a further aspect of the invention there is provided a hydroponic growing system for growing a predetermined crop, the system further comprising a pre-treatment portion and a high care portion, the high care portion comprising apparatus for seeding, germinating and growing the crop, and further comprising means for reducing contamination during the seeding, germination and growing of the crop.

The method may include moving a succession of support vehicles through a plurality of intermediate positions between the initial and final positions and removing a support vehicle from a final position to allow another support vehicle to be inserted at an initial position.

The method may comprise growing a crop in a modular structure comprising a plurality of levels, each including at least one guideway and a plurality of support vehicles arranged for driven movement on the guideway.

Preferably the method includes irrigating the crop with an irrigation fluid, more preferably comprising water and nutrients. The method may include recirculating the irrigation fluid. In a preferred arrangement the method includes screening and/or irradiating the irrigation fluid with ultraviolet radiation, more preferably UV-C radiation.

In a further aspect, the invention provides a computer programme product on a computer readable medium, comprising instructions that, when executed by a computer, cause the computer to perform a method of growing a crop hydroponically according to any statement herein.

The invention also comprises a program for causing a device to perform a method of growing a crop hydroponically according to any statement herein.

The invention may include any combination of the features or limitations referred to herein, except such a combination of features as are mutually exclusive, or mutually inconsistent.

Preferred embodiments of the present invention will now be described, by way of example only, with reference to the accompanying diagrammatic drawings, in which.

Figure 10A:
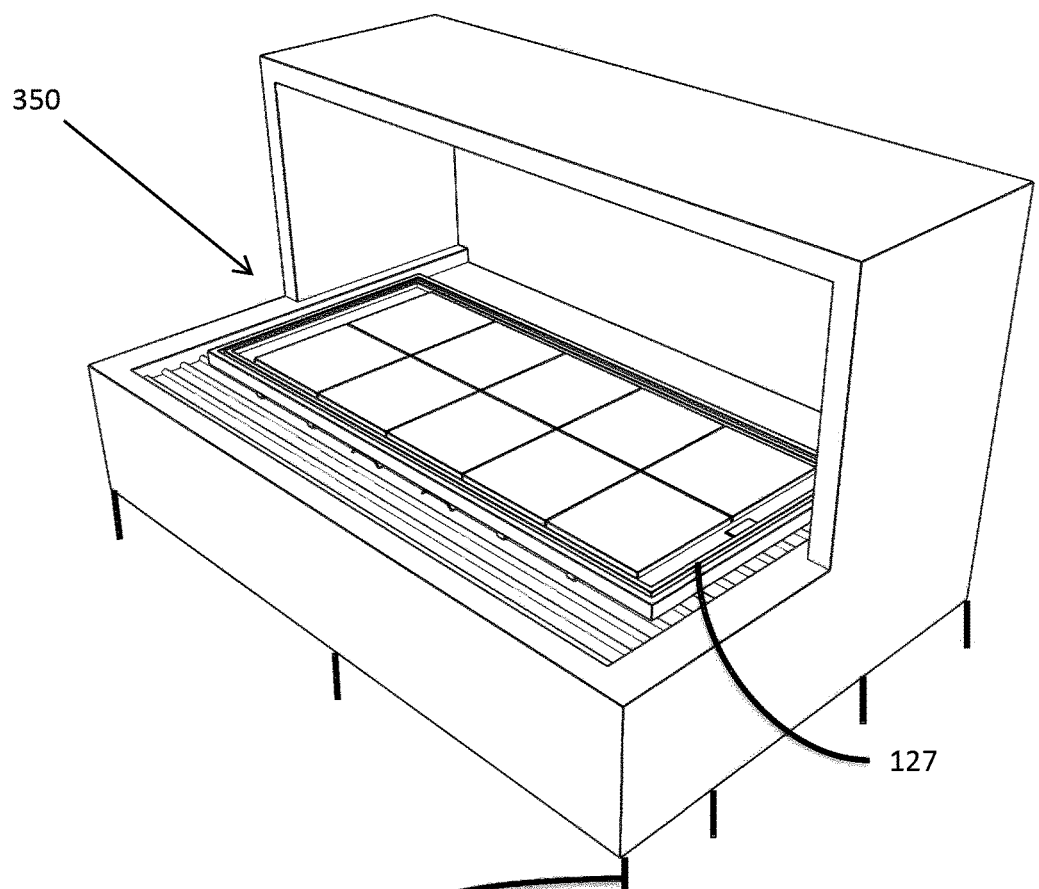
Figure 10B:
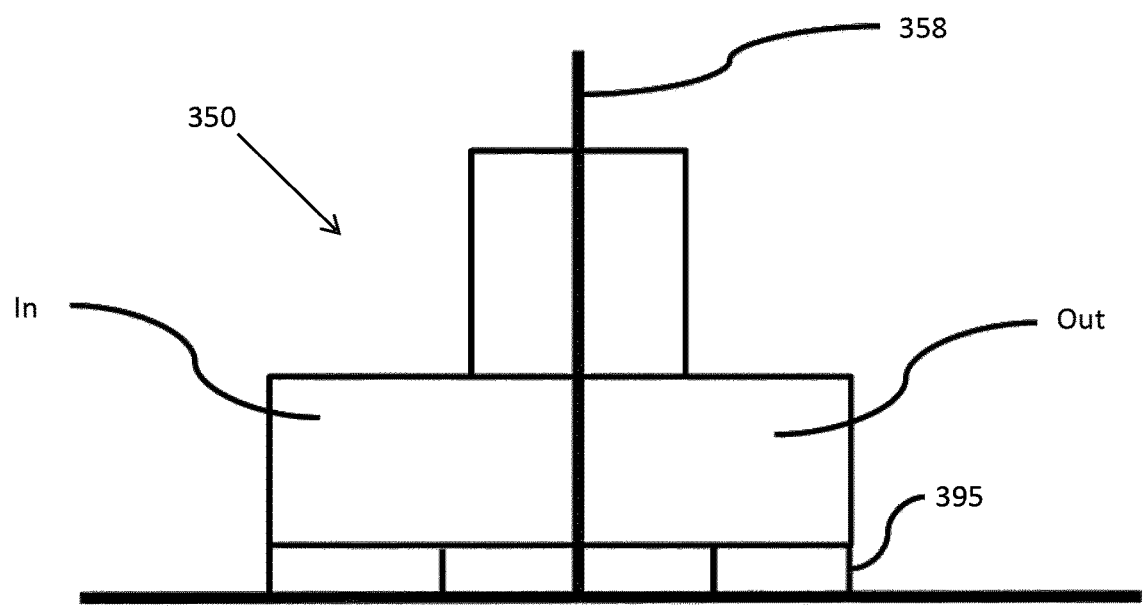
Figure 11A:
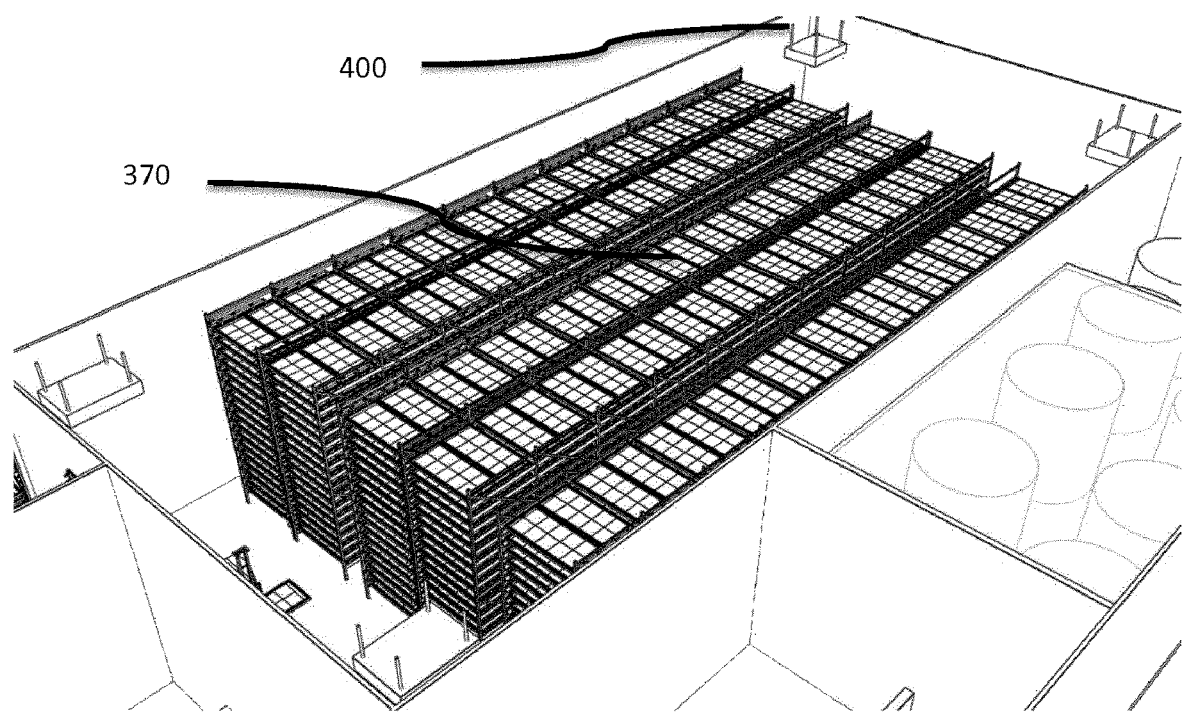
Figure 11B:
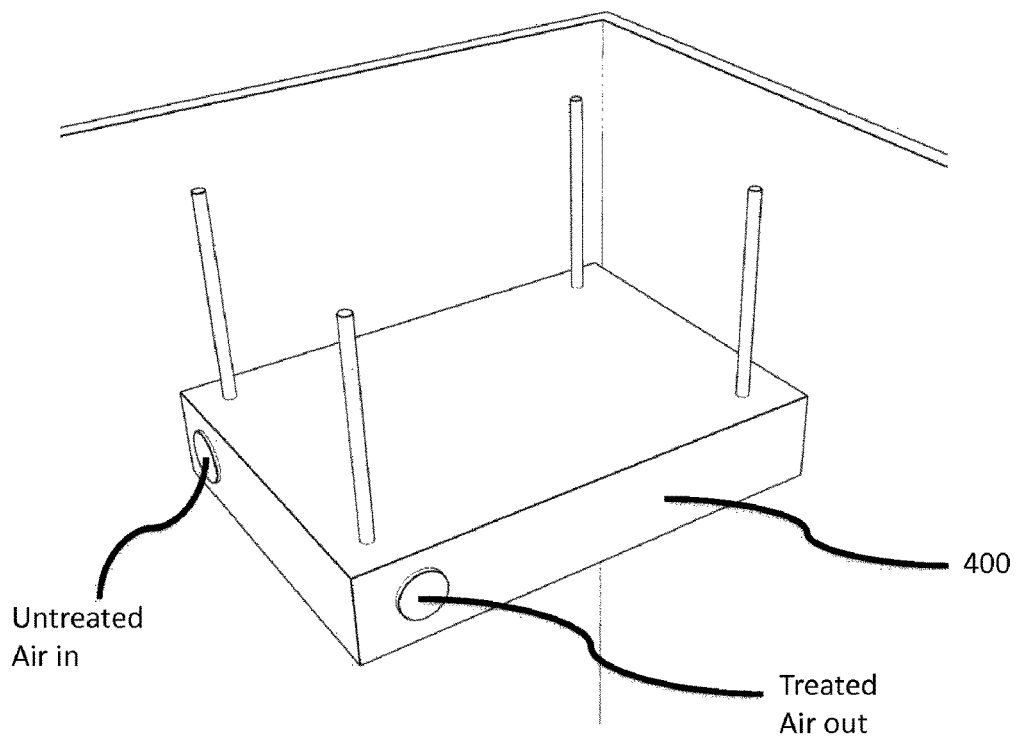

FIGS. 10a and 10b are schematic views of one form of transfer hatch for use with the hydroponic growing system of FIGS. 1 to 8, the hatch acting between variously the high care portions of the system and the various areas and volumes in accordance with the invention and other areas of the system; and FIGS. 11a and 11b are schematic views of further apparatus for use with the system of FIGS. 1 to 10, the apparatus operable in the high care portion of on form of the inventive system.

Figure 1:
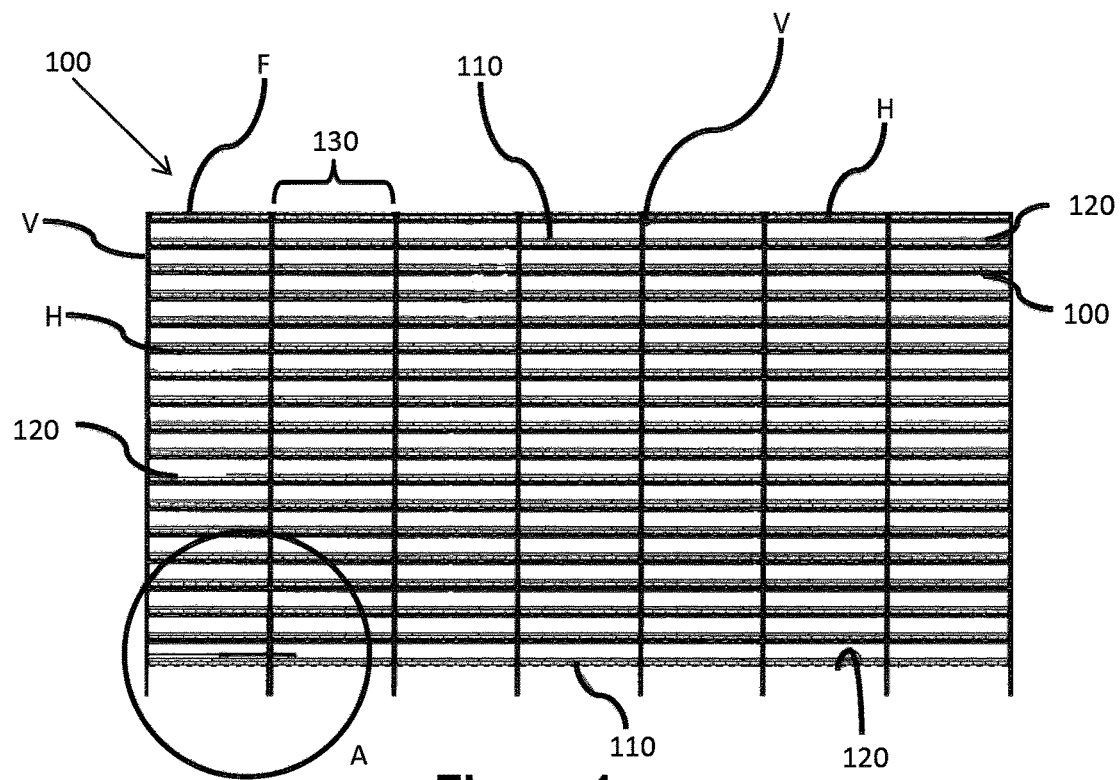
FIG. 1 shows schematically, in side view, apparatus forming part of a hydroponic growing system according to an embodiment of the present invention.
Figure 2:
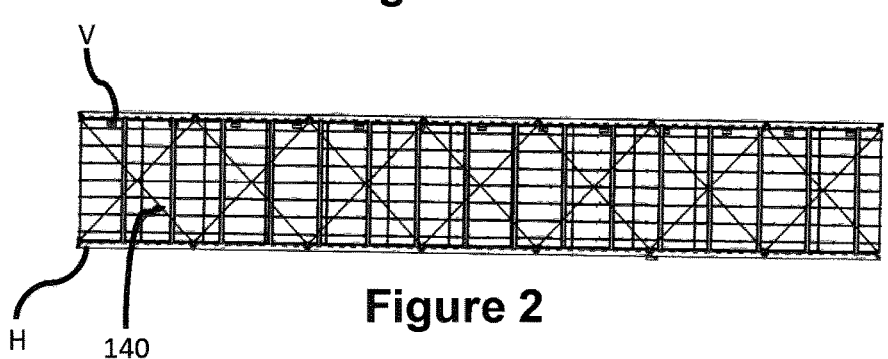
FIG. 2 shows the apparatus of FIG. 1 from above.
Figure 3:
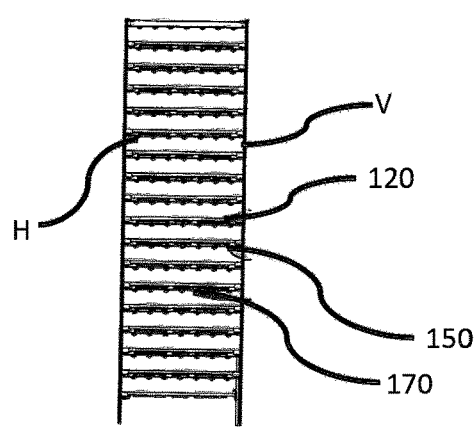
FIG. 3 shows the apparatus of FIGS. 1 and 2 from an end.

Turning to FIGS. 1 to 3, these show, generally at 100, and respectively from the side, from above and from one end, a growing apparatus as part of a hydroponic growing system according to a first preferred embodiment of the present invention.

The apparatus 100 comprises a frame F, of vertical members V and horizontal members H, which supports a plurality of horizontal tracks or guideways 110 on which a set of growing vehicles 120 are mounted for horizontal movement. The growing vehicles each contain a number of growing trays (not shown) in which plants (not shown) are accommodated as they grow.

During growth of the plants the vehicles 120 are moved, from left to right in FIG. 1, as will be described later, in an indexed fashion so that the vehicles sequentially occupy one of a plurality of growing stations 130, over a period judged to be sufficient to grow the plants from an initial condition, which may be a seed or seedling state, to a final position, which may be a harvest-ready state.

FIG. 2 shows the apparatus from above, from which it can be seen that cross-brace members 140 connect the sides, providing extra structural strength and rigidity for the frame.

Figure 4:
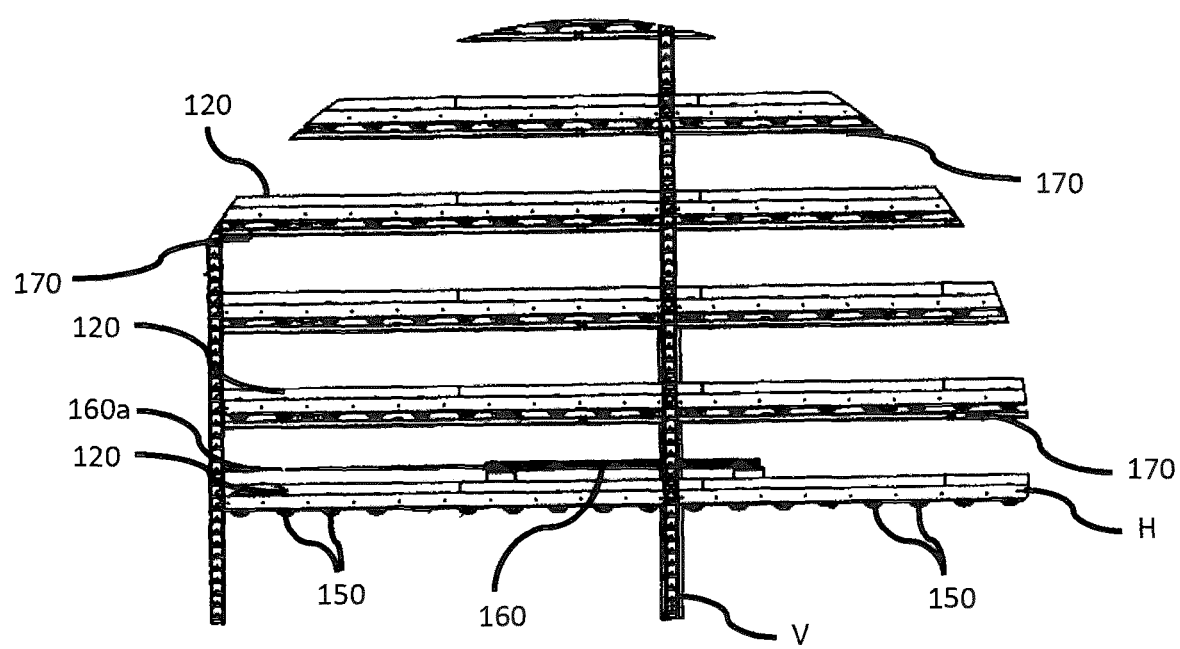
FIG. 4 is an enlarged view of a part of the apparatus of FIG. 1 marked A.

Turning now to FIG. 4, which shows an enlarged portion A of FIG. 1, it can be seen that each of the vehicles is supported for rolling movement on wheels 150 which are mounted on the horizontal frame members H. The vehicles have peripheral lips or flanges (not shown) at their edges which roll against the wheels.

The vehicles 120 are moved periodically by pneumatic actuators 160, which in the example comprise air rams. An actuator is located on each level. However, in FIGS. 1 and 4 only a single actuator is shown, the rest being omitted in the interests of clarity. An arm 160a of the actuator connects to and drags the leftmost vehicle 120 and moves it one station to the right before releasing the vehicle. The next time the actuator is triggered it again grabs the leftmost vehicle and drags it to the right. Each time the vehicle is dragged it pushes the others one position to the right. The vehicle in the rightmost station 130R, which corresponds to the final, or harvest-ready, position must then be removed.

Horizontally extending strip lights 170 are provided above each growing station. The lights provide energy for the growing crop and may be any of a number of currently available lights, typically LED's, the wavelength and intensity of which are chosen to optimise the growing conditions for the selected crop.

In addition, an irrigation system (not shown) is provided in which water and nutrients are supplied into the vehicles so that the plants in the growing trays 127 can be nourished. An overflow system (not shown) collects excess fluid for recycling.

Figure 5:
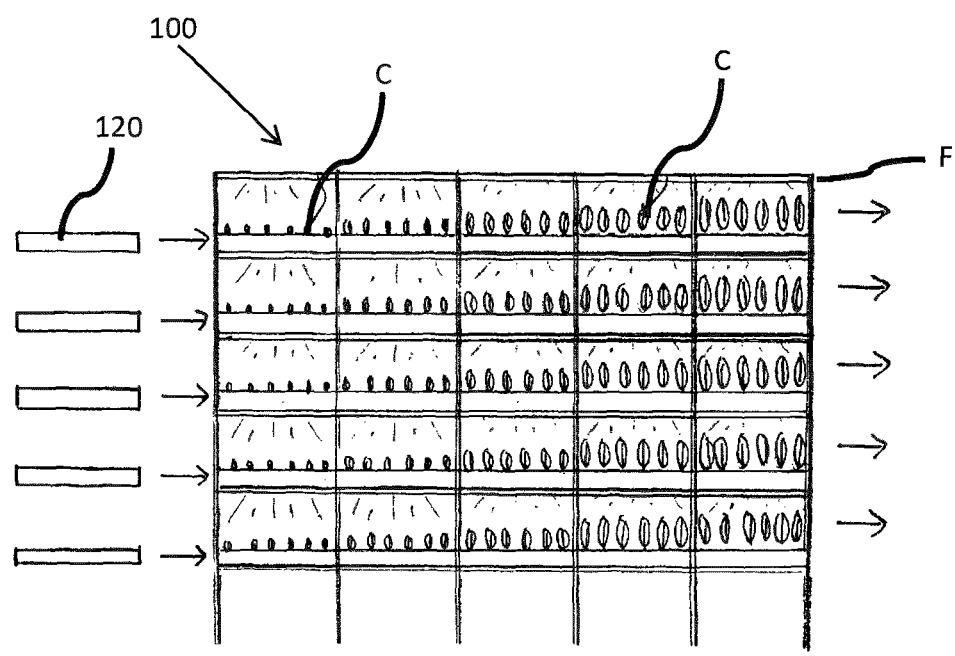
FIG. 5 is a schematic view of the apparatus in use.

FIG. 5 shows schematically the method of use of the apparatus 100. At the left most side of the frame are vehicles 120 containing growing trays (not shown) which include a growing medium 125, which in this case is Rockwool™, and seeds or seedlings (not shown). Under the control of the actuators (omitted from this drawing) the vehicles are periodically moved to the right, through the various growing stations 130. A crop C is shown in progressive stages of growth. At the rightmost station 130R the crop is ready for harvest. As the rightmost vehicles are removed the remaining vehicles are indexed one position to the right and the leftmost station 130L becomes vacant. The new vehicles are then introduced onto the guideway.

The units 100 can be connected together to form a growing system of any required size, making the system truly modular. The units 100 are shown as all the same size, with the same number of growing stations, but these too can be altered to suit the circumstances and the crop being grown.

Automated introduction and withdrawal of the vehicles 120 can be effected by any of several known apparatus, which is omitted from these schematic drawings in the interests of clarity.

Although the example shown schematically in FIG. 5 shows the same crop being grown on each level, this need not be the case. Different crops may be grown on the different levels. The timing of the movement of the vehicles can be selected for each level, so as to optimise the growth of individual crops.

Figure 6:
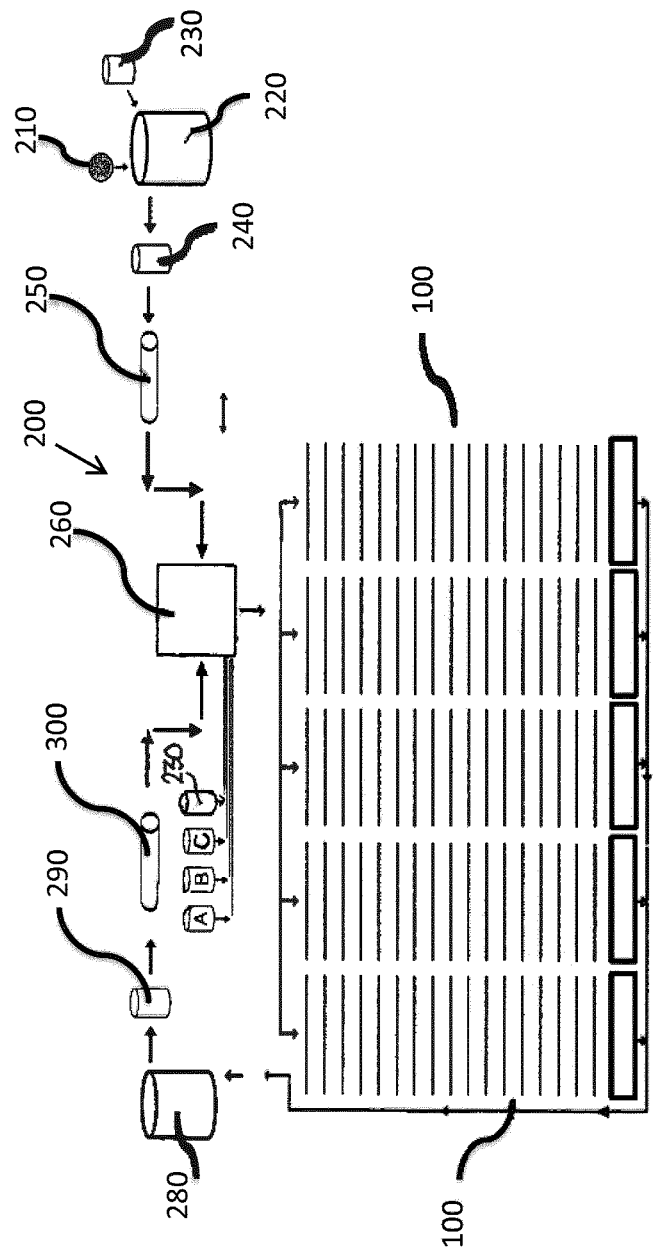
FIG. 6 is a schematic view of an irrigation system for use with the apparatus of FIGS. 1 to 4.

Turning to FIG. 6, this shows schematically an irrigation system 200 for the growing system according to the present invention. The system provides water and nutrients to a crop growing in the rack units 100.

Mains water is introduced to the system at 210 and enters a mains water tank 220. An additive tank 230 supplies the mains water tank 220 with an acid neutralizer. The mains water is screen filtered in first filter 240 before passing through a first UV sterilizer 250 and on to a blend tank 260. In the blend tank the water is dosed with nutrients from nutrient dosing tanks A, B and C. A further acid tank 230 is also present to allow for the optimisation of the pH of the irrigation water, which is then pumped to the growing racks 100.

Water drains from the growing racks 100 and is recirculated to a drain water tank 280 from where it passes through a second screen filter 290 and a second UV sterilizer 300 before being reintroduced to the racks 100 via the blend tank 260. The recirculated water can be used alone or blended/topped up with fresh water.

The irrigation apparatus provides for a careful control and optimisation of the growing process and at the same time minimises the waste of water.

Referring now to FIGS. 7 to 11, it will be appreciated that the foregoing apparatus forms a small part of a much larger hydroponic growing system. One embodiment of the hydroponic growing system incorporating the apparatus of FIGS. 1 to 6 will now be described with reference to FIGS. 7 to 11. It will be appreciated that the system as is exemplary only and other combinations and configurations of the apparatus and equipment described may be used without departing from the scope of the invention described herein.

The hydroponic growing system in accordance with one form of the invention comprises a system in which crucial parts of the system comprise a 'high care' environment. A high care environment is defined as an area requiring high levels of hygiene, careful and clean working practices, fabrication, and the design of facilities and equipment to minimise product contamination with regard to microbiological hazards. Generally speaking products produced in high care areas will have undergone a process to reduce any microbiological contamination prior to entering the high care area.

In hydroponic growing systems, the concept of high care environments has not been fully utilised. Contamination in the absence of such a high care environment can lead to reduction in yield of a given crop, infestation requiring sanitisation of a significant volume of the growing chamber or loss of a given crop entirely.

In one form of the present invention, the apparatus of FIGS. 1 to 6 forms part of a hydroponic growing system having high care portions and conventional portions in which the control of assets and services throughout the system is carefully controlled and in which the nutrients, air and water supplied to the system is treated in accordance with high care principals.

Figure 7:
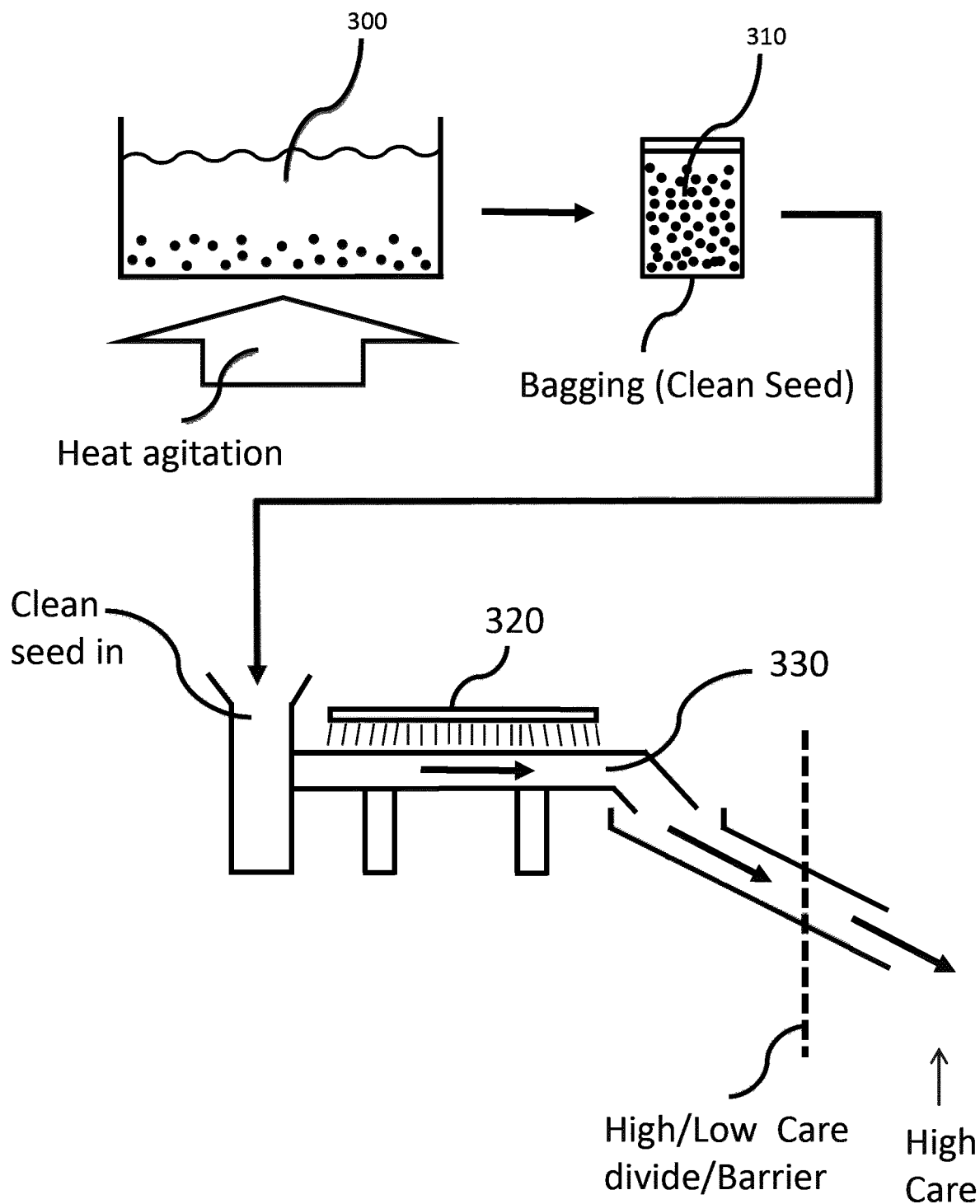
FIG. 7 is a schematic view of one form of the hydroponic growing system comprising the apparatus of FIGS. 1 to 6, further showing a system having high care portions in accordance with a further form of the invention.
Figure 8:
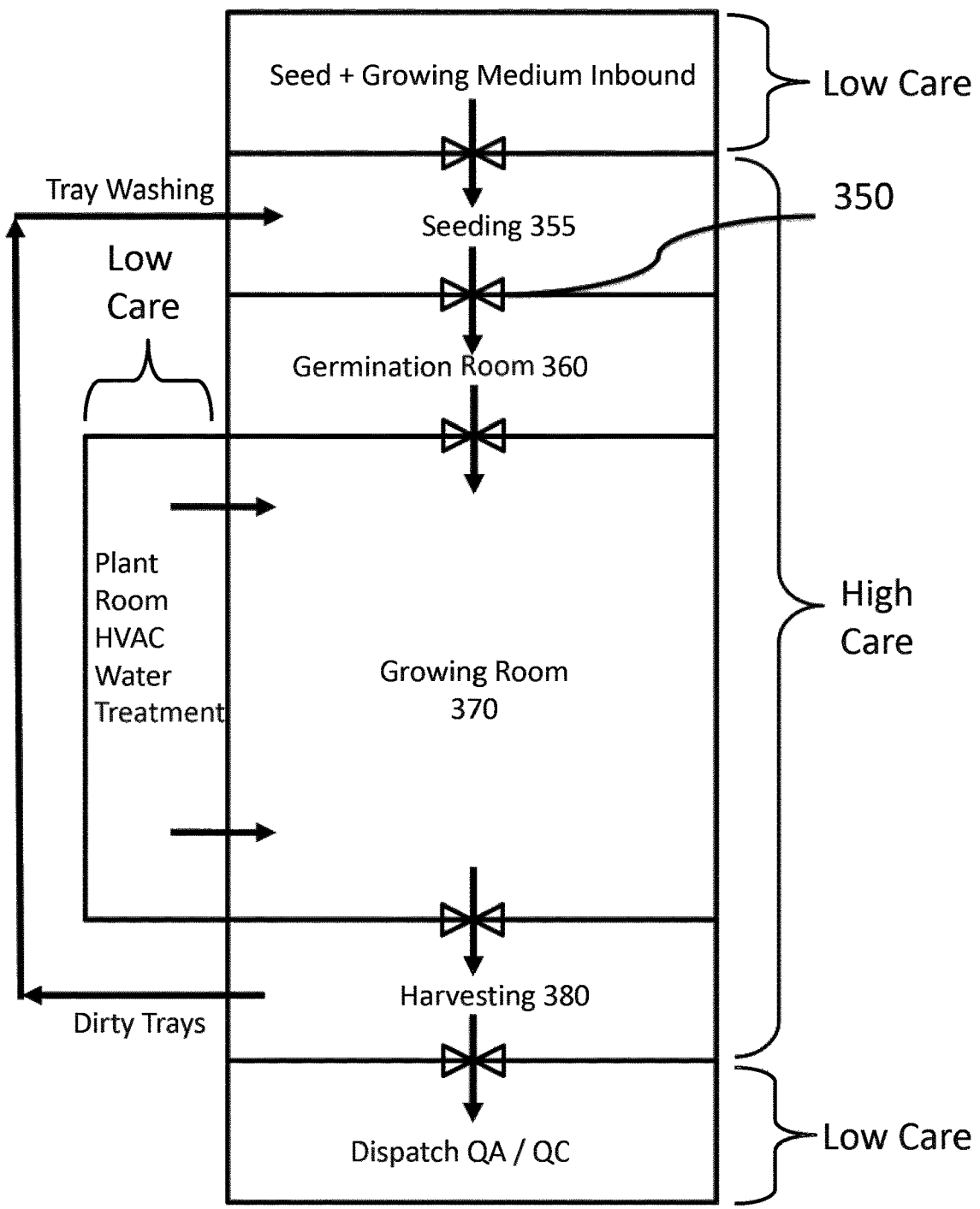
FIG. 8 is a further schematic view of the system of FIG. 7 showing the high care portions of the system in more detail.
Figure 9:
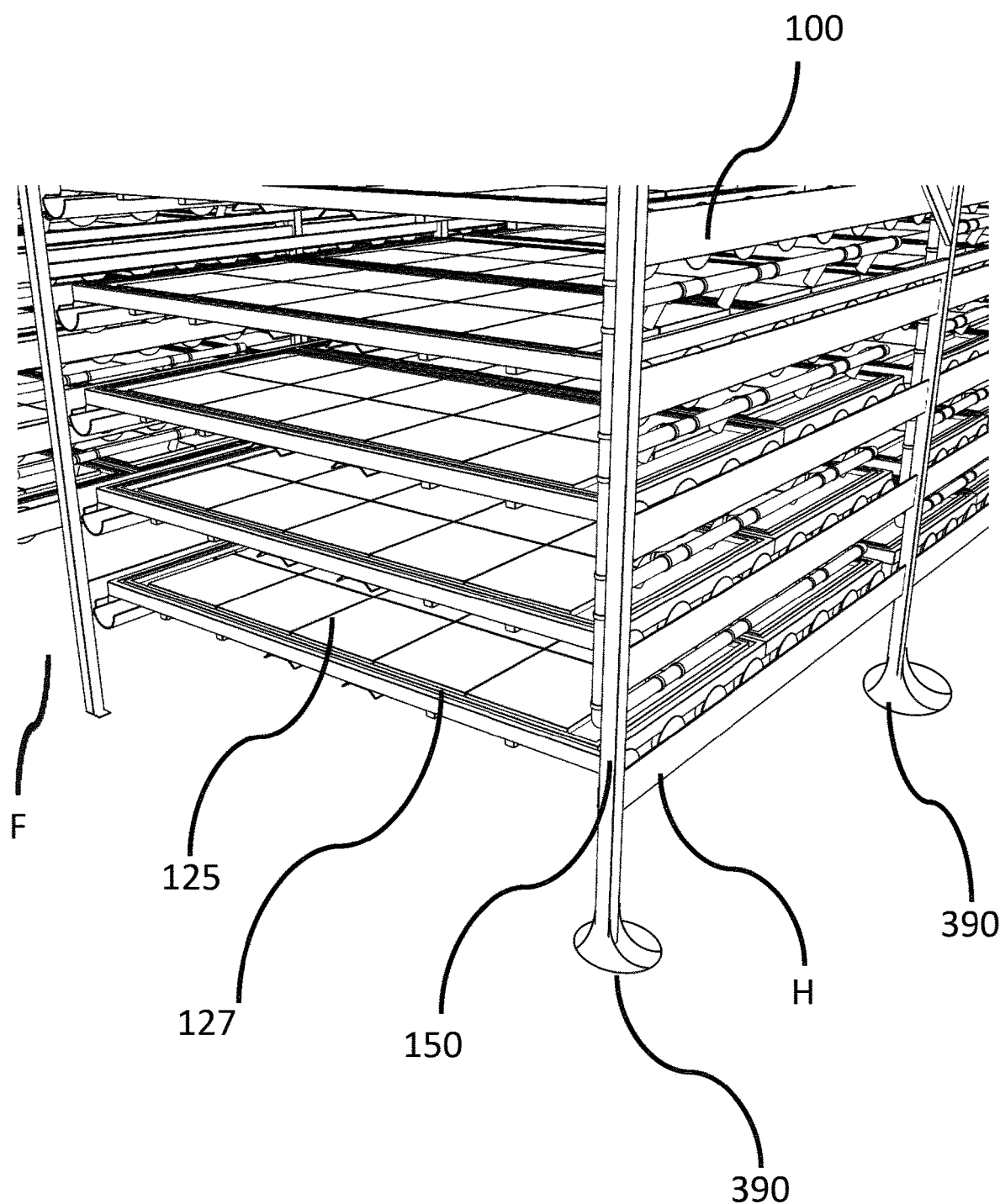
FIG. 9 is a schematic view of the apparatus in use in the hydroponic growing system of FIGS. 1 to 8 showing additional high care features of the system in accordance with a further embodiment of the invention.

FIG. 7 is a schematic diagram of a first portion of the hydroponic growing system in accordance with one form of the invention. The hydroponic growing system comprises a seed and equipment pre-treatment area, a high care portion and a dispatch portion. The high care portion comprises a seeding area, a germination volume, a growing volume, and a harvesting area.

The seed and equipment pre-treatment area comprises hot water treatment means, UVC treatment means and in the case of the seeds, may comprise agitation means.

The high care portion of the hydroponic growing system comprises equipment designed, treated and installed so as to assist in the maintenance of a high care environment for seeding, germinating, growing and harvesting crops of any variety.

In order to assist with cleaning equipment located within the high care portion is preferably raised off the floor and comprises stands or legs 395 having radiussed feet means 390. The radiussed feet 390 enable the equipment to be more easily cleaned and the equipment being raised off the floor enables cleaning to be more easily effected.

Preferably, all uprights of apparatus and where possible as much of the equipment in the high care portion of the system as possible is painted or treated with antimicrobial paint such as, for example, paint comprising silver.

Preferably the walls, floor and ceiling of the high care portion of the hydroponic growing system are painted white to enable visual checks of the overall cleanliness of the growing system.

Preferably the amount and length of drainage system is reduced to prevent contamination by water borne contaminants and to enable regular deep cleaning of the whole system.

It will be appreciated that ethylene may be produced in the germination and growing volumes of the system and this ethylene can stimulate decomposition in fresh or growing produce, and it is vital that where unprocessed produce is held in storage, ethylene is controlled, to ensure that the freshness is preserved and that waste from the process is minimised.

Preferably, the high care portion of the hydroponic growing system comprises means for removing ethylene 400 from the high care portion of the system as shown in FIGS. 11*a* and 11*b*. The ethylene removal means 400 may be present in any one or any combination of the seeding area 355, the germination volume 360, the growing volume 370 and the harvesting area 380. Such ethylene removal means may comprise ethylene scrubbers 400 that comprise dry chemical scrubbers. These machines generally have a pre-filter, a chemisorption bed and an after filter acting so as to remove ethylene from the environment. However, it will be appreciated that any other form of ethylene removal means may be used.

In use, a hydroponic growing system comprising a high care portion in accordance with one form of the invention may be used to produce crops with little contamination. One such method for producing crops in a high care environment will be described below with reference to FIGS. 7 to 11.

Seeds for planting and growing in a high care environment are pre-treated in such a seed pre-treatment area. Such pre-treatment may comprise hot water and UVC treatment. Additionally, the seeds may be agitated. Once treated, the seeds are bagged and sealed.

In the pre-treatment area, all growing media and equipment for use in the high care facility are treated with a combination of hot water and UVC to reduce as far as possible the chances of contamination within the high care portion of the hydroponic growing system.

Once the seeds, the growing media and trays 127 are all pre-treated they are transferred to the high care portion of the hydroponic growing system.

These pre-treatment steps may be undertaken at a location remote from the high care portion of the system, however, it will be appreciated that such pre-treatment zones may be co-located with the high care portion of the hydroponic growing system.

The high care portion of the hydroponic growing system comprises a seeding area, a germination volume 360, the apparatus of FIGS. 1 to 6 located in a growing volume 370, and a harvesting volume 380.

As required, the cleaned seeds 310 are further treated by, for example, UVC radiation 320 immediately prior to arrangement on growing medium in the seeding area, the growing medium being located in the trays 127 of the apparatus of FIGS. 1 to 6. The seeds may be continually vibrated by vibrating means comprising, for example, a vibrating plate 330 whilst UVC treated and whist being arranged on the growing medium. The speed of vibration of the plate may be controllable and the speed used will depend on the particular seeds being processed, the size and variety of the seed and the effect of the vibration with the UVC on the seeds.

Once the equipment and seeds have been pre-treated as required, the seeds are arranged on the growing medium within the trays 127 and the trays 127 pass through a transfer hatch 350 located between the seeding area and the growing area. The transfer hatch 350 can be seen in more detail in FIGS. 10*a* and 10*b*. The transfer hatch 350 comprises means for transferring trays between areas and volumes of the system bounded by walls 358, for example, in a manner consistent with the maintenance of the high care environment.

The trays 127 comprising growing media and seeds 310 are transferred in to the germination volume 360 of the hydroponic growing system. The germination volume 360 comprises racking on which the trays 127 comprising the seeds 310 are placed for a predetermined time. The predetermined time depends on the seed type, the growth cycle and the yield required for any given crop. It will be appreciated that control of the environment in the germination volume 360 may enable the time taken to germinate seeds to be controlled to a certain extent.

The environment in the germination volume 360 may be controlled. For example, the temperature, humidity, air flow and lighting conditions may be controlled either manually or by a suitable control mechanism. The environment in the germination volume 360 may be sensed by a series of sensors and detectors and the environment controlled according to the environment detected by the sensors or detectors. Such control may be carried out remotely by a suitable control utility.

Once germinated, the seeds are moved to the growing volume 370. The growing volume may comprise the apparatus described above with reference to FIGS. 1 to 6. However, it will be appreciated that any suitable growing apparatus may be used in the high care environment of the growing volume 370. For example, the growing trays 127 may be placed on moveable racking or may be placed using a pick and place system either robotically or manually.

The germinated seeds remain in the growing volume 370 until the crop is deemed ready to harvest. This may be determined visually by operators or may be determined remotely using camera means to view the progress of growth of the crop.

In a similar manner to that described with reference to the germination volume 360, the environment in the growing volume 370 may be detected, monitored and controlled by suitable sensing, monitoring and controlling means. Control of the environment within the growing volume 370 may be carried out remotely by a suitable control utility.

Once deemed ready to harvest, the trays 127 comprising the crops are removed from the growing volume 370 and transferred by any suitable means, robotic or manual, to a harvesting area where the crop is picked, harvested or processed in the appropriate manner for the given crop. Once harvested, the crop may be bagged for onward delivery to direct customers or to commercial retail enterprises.

Only once the crop is harvested and bagged will it leave the high care portion of the hydroponic growing system.

It will be appreciated that high care seeding, germinating, harvesting and growing environments reduce contamination during the production of crops in a hydroponic growing system.

It will be appreciated that the seeding area, the germination volume, the growing volume and the harvesting area may be collocated in a single building. However, it will also be appreciated that it is possible to locate the areas and volumes in different locations, however, the high care environments would need to be controlled in a similar manner across all locations with high care transfer means implemented between locations.

It will further be appreciated that the seeding area, the germination volume, the growing volume and the harvesting area may be located in adjacent rooms of a single building or may be located in a single volume with separately definable volumes as required. In this case, barriers and air locks between the various areas and volumes will be used. One example of such an airlock is shown in FIGS. 10*a* and 10*b*.

It will be appreciated that the system described above includes many known aspects of high care treatment. However, it may become possible to apply other treatment regimens or to use other forms of equipment to achieve the result described herein.

Moreover, the system described above may be used to grow a single crop or multiple crops in a single facility. Any crop suitable for growth in a hydroponic growing system may be grown in a high care portion of such a growing system.

The hydroponic growing system described above with reference to the Figures allows control of the growing environment and thus reduces the risk of microbiological contamination. In addition, the modular nature of the system allows for efficient use of space and ready scalability. The length, width and height of the rack units can be chosen to fit the available space. Accordingly crop yields and growing times are improved, contamination is minimised, shelf life is improved and the environmental impact is minimised.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

The invention claimed is:

1. A hydroponic growing system comprising:
 a support structure including a plurality of vertically spaced levels, wherein each level comprises:
  a plurality of support vehicles configured to contain a growing crop in use;
  a plurality of growing stations arranged in a series from an initial growing station to a final growing station, each growing station being configured to be occupied by one of the plurality of support vehicles, and each growing station includes an irradiating apparatus for irradiating, with a light source, the growing crop in the support vehicle occupying the growing station;
  a guideway configured to guide movement of the support vehicles between the initial growing station and the final growing station; and
  a drive unit configured, in use, to periodically engage and move a support vehicle occupying the initial growing station to a next growing station in the series, pushing each of the other support vehicles on the guideway one growing station along in the series.

2. A hydroponic growing system according to claim 1, comprising:
 an irrigation system arranged to irrigate the growing crop, the irrigation system having at least one supply conduit and at least one overflow conduit arranged to collect excess fluid for recycling.

3. A hydroponic growing system according to claim 2, wherein the irrigation system is configured and arranged to supply water, to the growing crop within the plurality of support vehicles.

4. A hydroponic growing system according to claim 3, wherein the irrigation system is configured and arranged to supply one or more nutrients to the growing crop within the plurality of support vehicles.

5. A hydroponic growing system according to claim 1, wherein the support vehicles each contain one or more growing trays which themselves include a growing medium for growing a crop.

6. A hydroponic growing system according to claim 1, wherein the guideway comprises:
 a path or track including one or more bearings, or rollers or wheels, against which a portion of each support vehicle is arranged to roll.

7. A hydroponic growing system according to claim 1, wherein each support vehicle comprises:
 one or more bearings, rollers or wheels, configured and arranged to run in a track of the support structure.

8. A hydroponic growing system according to claim 1, wherein the drive unit comprises:
 pneumatic means, configured as a pneumatic actuator or air ram.

9. A hydroponic growing system according to claim 1, the system comprising:

a pre-treatment portion and a high care portion, the high care portion having an apparatus for seeding, germinating and growing a crop; and means for reducing contamination during the seeding, germination and growing of the crop.

10. A hydroponic growing system according to claim 9, wherein:

the apparatus for seeding, germinating and growing a crop is raised above a ground level.

11. A hydroponic growing system according to claim 10, comprising:

antimicrobial paint on the apparatus within the high care portion of the system.

12. A hydroponic growing system according to claim 11, in which the antimicrobial paint contains silver.

13. A hydroponic growing system according to claim 9, in which the high care portion comprises:

means for reducing ethylene from an environment of the high care portion.

14. A hydroponic growing system according to claim 9, comprising in combination:

means for controlling an environment in the high care portion of the system, the means for controlling the environment being located remote from the growing system.

15. A hydroponic growing system according to claim 9, comprising:

means for sensing and monitoring an environment within the high care portion.

16. A method of growing a crop hydroponically using a hydroponic growing system, the hydroponic growing system including, a support structure including a plurality of vertically spaced levels, wherein each level includes, a plurality of support vehicles configured to contain a growing crop in use, a plurality of growing stations arranged in a series from an initial growing station to a final growing station, each growing station being configured to be occupied by one of the plurality of support vehicles, and each growing station includes an irradiating apparatus for irradiating, with a light source, the growing crop in the support vehicle occupying the growing station, a guideway configured to guide movement of the support vehicles between the initial growing station and the final growing station, and a drive unit configured, in use, to periodically engage and move a support vehicle occupying the initial growing station to a next growing station in the series such that each of the other support vehicles on the guideway are pushed one growing station along in the series, the method comprising:

on one or more of the plurality of levels, periodically using the drive unit to move a support vehicle occupying the initial growing station to the next growing station in the series, pushing the other support vehides on the guideway aWepsehed one growing station along in the series.

17. A method according to claim 16, further comprising:

removing a support vehicle occupying the final growing station and inserting another support vehicle into the initial growing station.

18. A method of growing crops in a high care environment, the method comprising:

seeding a growing medium with seeds;

germinating the seeds;

growing a crop from the seeds; and harvesting the crop, the crop being seeded, germinated, grown and harvested in a high care environment within a hydroponic growing system having a support structure including a plurality of vertically spaced levels, wherein each level includes, a plurality of support vehicles configured to contain a growing crop in use, a plurality of growing stations arranged in a series from an initial growing station to a final g rowing station, each growing station being configured to be occupied by one of the plurality of support vehicles, and each growing station includes an irradiating apparatus for irradiating, with alight source, the growing crop in the support vehicle occupying the growing station, a guideway configured to guide movement of the support vehicles between the initial growing station and the final growing station, and a drive unit configured, in use, to periodically engage and move a support vehicle occupying the initial growing station to a next growing station in the series, pushing each of the other support vehicles on the guideway one growing station along in the series.

* * * * *